United States Patent
Wang et al.

(10) Patent No.: US 11,351,802 B2
(45) Date of Patent: Jun. 7, 2022

(54) MODEL INVERSION-BASED ITERATIVE LEARNING CONTROL METHOD FOR PRINTER AND PRINTER SYSTEM

(71) Applicant: Guangdong Ocean University, Guangdong (CN)

(72) Inventors: Yulin Wang, Guangdong (CN); Huanlao Liu, Guangdong (CN); Can Liu, Guangdong (CN); Haitao Liu, Guangdong (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 17/527,161

(22) Filed: Nov. 15, 2021

(65) Prior Publication Data
US 2022/0072885 A1    Mar. 10, 2022

Related U.S. Application Data

(63) Continuation of application No. PCT/CN2021/117584, filed on Sep. 10, 2021.

(51) Int. Cl.
*B41J 29/393*    (2006.01)
*G06N 20/00*    (2019.01)

(52) U.S. Cl.
CPC ............ *B41J 29/393* (2013.01); *G06N 20/00* (2019.01)

(58) Field of Classification Search
CPC ..... G03G 15/6561; G03G 2215/00405; G03G 2215/00156; G06N 20/00
See application file for complete search history.

(56) References Cited

U.S. PATENT DOCUMENTS

| | | | | |
|---|---|---|---|---|
| 7,058,325 | B2* | 6/2006 | Hamby | G03G 15/5062 399/60 |
| 2004/0136015 | A1 | 7/2004 | Van de Capelle et al. | |
| 2008/0166153 | A1* | 7/2008 | Ehara | H04N 1/506 399/167 |
| 2012/0059617 | A1* | 3/2012 | Yang | G03G 15/6561 702/105 |
| 2013/0308962 | A1* | 11/2013 | Takagi | G03G 15/70 399/18 |

FOREIGN PATENT DOCUMENTS

| | | |
|---|---|---|
| CN | 104658368 A | 5/2015 |
| CN | 105643944 A | 6/2016 |

(Continued)

OTHER PUBLICATIONS

Gao Wei, Yu Li; Iterative learning control with bound input based on backstepping; Apr. 30, 2006; College of Information Engineering, Zhejiang University of Technology, Hangzhou 310032, China.

(Continued)

*Primary Examiner* — Lam S Nguyen

(57) ABSTRACT

A model inversion-based iterative learning control method for a printer and a printer system. An error of a desired trajectory and an actual displacement of a printing paper and an error of a reference input and an actual displacement of a motor are considered at the same time to construct an iterative learning control model for the printer based on an inversion model, so as to iteratively modify an error failing to meet requirements.

1 Claim, 5 Drawing Sheets

(56) References Cited

FOREIGN PATENT DOCUMENTS

| | | |
|---|---|---|
| CN | 107479385 A | 12/2017 |
| CN | 109015661 A | 12/2018 |
| CN | 111993801 A | 11/2020 |

OTHER PUBLICATIONS

Joost Bolder, Tom Oomen; Inferential Iterative Learning Control: A 2D-system approach; Apr. 3, 2016; Eindhoven University of Technology, Department of Mechanical Engineering, Control Systems Technology group, P.O. Box 513, 5600 MB Eindhoven, The Netherlands.

Joost Bolder, Tom Oomen, Sjirk Koekebakker, Maarten Steinbuch; Using iterative learning control with basis functions to compensate medium deformation in a wide-format inkjet printer; Jul. 11, 2014; Eindhoven University of Technology, Department of Mechanical Engineering, Control Systems Technology group, P.O. Box 513, 5600 MB Eindhoven, The Netherlands.

\* cited by examiner

MODEL INVERSION-BASED ITERATIVE LEARNING CONTROL METHOD FOR PRINTER AND PRINTER SYSTEM

CROSS-REFERENCE TO RELATED APPLICATIONS

This application is a continuation of International Patent Application No. PCT/CN2021/117584, filed on Sep. 10, 2021, which claims the benefit of priority from Chinese Patent Application No. 202010949000.1, filed on Sep. 10, 2020. The content of the aforementioned application, including any intervening amendments thereto, is incorporated herein by reference in its entirety.

TECHNICAL FIELD

The present application relates to the printing accuracy control of the printer, and more particularly to a model inversion-based iterative learning control method for a printer and a printer system.

BACKGROUND

The development of science and technology and the improvement of social economy boost the demand for printers, especially large format printers. Wide-format printers refer to printers with a printing width exceeding A2 (42 cm). The most basic indicator for evaluating the large format printer is the printing accuracy. The printers with good printing accuracy present clear printing effect, and have no ghosting and blur. The appearance of the ghosting means that the printer suffers excessive vibration during the operation, and also reflects that there is a defect in the control method and system design, which may lead to an increased rejection rate.

Light weight is the development trend of large format printers. Therefore, it is inevitable to introduce flexible mechanisms. The large format printer system is a typical multi-body dynamic system. Due to the flexibility (from the paper) in the transmission process, the high-accuracy control of the large format printer has attracted considerable attention in industrial automation. At present, the printing accuracy of the printer is controlled mainly by sliding mode control, variable structure control, robust control and learning control. Except for the learning control, the remaining control methods are all feedback control methods. Since the displacement of the printing paper is obtained by the low-cost scanner through image processing and cannot be obtained in real time, only the motor position defined by the encoder is accessible to the feedback control in real time; however, the motor position cannot reflect the final displacement of the printing paper. Therefore, such methods that only regulate the error of motor have a big limitation for performance improvement.

The learning control, such as the iterative learning control method, can fully track the desired trajectory in theory. Nevertheless, the existing iterative learning control methods can only track a single target. In April 2016, Bolder J et al. (Bolder J, Oomen T. Inferential Iterative Learning Control: A 2D-system approach[J]. *Automatica*, 2016, 71:247-253.) used the desired trajectory as a constant reference, and then the feedback control regulated the motor-side position and iterative learning control method regulated the printing-paper position to improve the tracking accuracy of the printing paper. However, since the transfer function between the motor to the printing paper of the printing system is not equal to 1, the error of the motor will be increased, causing the jitter or vibration of the printing system, which accelerated the wear of the mechanical system and reduced the tracking accuracy of the system. In July 2014, Bolder Joost et al. (Bolder J, Oomen T, Koekebakker S, et al. Using iterative learning control with basis functions to compensate medium deformation in a wide-format inkjet printer[J]. *Mechatronics*, 2014, 24(8):944-953.) also used the iterative learning control method to regulate the error result of the printing paper, whereas the reference was shaped before entering the servo system that desired trajectory was filtered by an accurate model inversion. However, the mathematical model is not fixed and varies with different operating conditions, and it is not easy to obtain precisely in practice. The model deviation may still cause the jitter or vibration of the mechanism system, deteriorating the robustness and printing performance of the system.

SUMMARY

An object of this disclosure is to provide a model inversion-based iterative learning control method for a printer and a printer system, which improves the tracking control accuracy and robustness to provide a better print quality, so as to solve the problem that the existing printing control methods merely perform error control on a single target, either an error of a motor or an error of a paper side, and are over dependent on an accurate system model, failing to balance a goal of error suppression of the motor and the printing paper.

Technical solutions of this disclosure are described as follows.

In a first aspect, the present disclosure provides a model inversion-based iterative learning control method for a printer, comprising:

(S1) setting a desired trajectory $r_d$ of the printer;

(S2) initializing a reference input $r_0$ and a control compensation $u_0$ of the printer, and setting $r_0=r_d$ and $u_0=0$;

(S3) obtaining, by an identification module, a transfer function $P_m(z)$ between a driving torque of the printer and a displacement of a motor and a transfer function $P_z(z)$ between the displacement of the motor to a displacement of a printing paper; and determining a transfer function $C(z)$ for a feedback control law, wherein z is either a time advanced operator or a complex variable of a z-transform;

(S4) constructing a sequence of a modified control compensation $u_k$ and a sequence of a modified reference input $r_k$, wherein k is the number of trials in an iterative learning process;

(S5) obtaining an actual displacement $y_k^m$ of the motor and an actual displacement $y_k^z$ of the printing paper in the k-th trial in the iterative learning control process according to the transfer function $P_m(z)$, the transfer function $P_z(z)$ and the transfer function $C(z)$;

(S6) establishing a model of an error sequence $e_k^z$ between the desired trajectory $r_d$ and the actual displacement $y_k^z$ of the printing paper to obtain the error sequence $e_k^z$, and establishing a model of an error sequence $e_k^m$ between the reference input and the actual displacement $y_k^m$ of the motor to obtain the error sequence $e_k^m$;

(S7) obtaining an inversion model $G^{-1}$, according to the model of the error $e_k^z$ between the desired trajectory $r_d$ and the actual displacement $y_k^z$ of the printing paper and the model of the error $e_k^m$ between the reference input and the actual displacement $y_k^m$ of the motor;

(S8) constructing a model inversion-based iterative learning control model of the printer based on the inversion model $G^{-1}$, in accompany with the model of the error sequence $e_k^z$ between the desired trajectory $r_d$ and the actual displacement $y_k^z$ of the printing paper and the model of the error sequence $e_k^m$ between the reference input and the actual displacement $y_k^m$ of the motor;

(S9) determining whether the error sequence $e_k^z$ between the desired trajectory $r_d$ and the actual displacement $y_k^z$ of the printing paper, and the error sequence $e_k^m$ between the reference input $r_k$ and the actual displacement $y_k^m$ of the motor are all less than $\varepsilon$; if yes, ending the iterative learning control process; otherwise, proceeding to step (S10); and (S10) inputting the error sequence $e_k^z$ between the desired trajectory $r_d$ and the actual displacement $y_k^z$ of the printing paper and the error sequence $e_k^m$ between the reference input and the actual displacement $y_k^m$ of the motor into the model inversion-based iterative learning control model of the printer to obtain the modified control compensation and the modified reference input; and proceeding to step (S4).

In the present disclosure, the transfer function $C(z)$ for the feedback control law is the conventional proportional-integral (PI) control law. The error sequence $e_k^z$ and $e_k^m$ are considered to construct a multi-input and multi-output model inversion-based iterative learning control model $r_{k+1}$. According to the error data of the previous batch, the unsatisfactory reference input and control compensation are adjusted, so as to improve the printing quality of the printer.

In some embodiments, in step (S4), the sequence of the modified control compensation $u_k$ is expressed as follows:

$$u_k = [u_k(1), u_k(2), \ldots u_k(N)];$$

the sequence of the modified reference input $r_k$ is expressed as follows;

$$r_k = [r_k(1), r_k(2), \ldots r_k(N)];$$

wherein N represents the maximum number of samples within discrete sampling time T; when k is 0, the sequence of the modified control compensation $u_k$ is the initialized control compensation $u_0$, and the sequence of the modified reference input $r_k$ is the initialized reference input $r_0$; and $u_k$ and $r_k$ are discrete-time sampling sequences of the modified control compensation and the modified reference input, respectively.

In some embodiments, in step (S5), the actual displacement $y_k^m$ of the motor in the k-th trial in the iterative learning control process is expressed as follows:

$$y_k^m = \frac{P_m(z)}{1+C(z)P_m(z)} u_k + \frac{C(z)P_m(z)}{1+C(z)P_m(z)} r_k;$$

the actual displacement $y_k^z$ of the printing paper is expressed as follows:

$$y_k^m = \frac{P_m(z)P_z(z)}{1+C(z)P_m(z)} u_k + \frac{C(z)P_m(z)P_z(z)}{1+C(z)P_m(z)} r_k;$$

wherein $P_m(z)$ represents the transfer function between the driving torque of the printer to the displacement of the motor; $P_z(z)$ represents the transfer function between the displacement of the motor to the displacement of the printing paper; and $C(z)$ represents the transfer function for the feedback control law.

In some embodiments, the model of the error $e_k^z$ between the desired trajectory $r_d$ and the actual displacement $y_k^z$ of the printing paper is expressed as:

$$e_k^z = r_d - y_k^z;$$

wherein $e_k^z$ represents an error sequence of the desired trajectory $r_d$ and the actual displacement $y_k^z$ of the printing paper;

the model of the error $e_k^m$ between the reference input $r_k$ and the actual displacement $y_k^m$ of the motor is expressed as:

$$e_k^m = r_k - y_k^m;$$

wherein $e_k^m$ represents an error sequence of the reference input and the actual displacement $y_k^m$ of motor; and $r_k$ represents the modified reference input.

In some embodiments, in step (S7), the inversion model $G^{-1}$ is obtained through steps of:

combining the model of the error sequence $e_k^z$ between the desired trajectory $r_d$ and the actual displacement $y_k^z$ of the printing paper and the model of the error sequence $e_k^m$ between the reference input and the actual displacement $y_k^m$ of the motor as follows:

$$\begin{bmatrix} e_k^m \\ e_k^z \end{bmatrix} = \begin{bmatrix} 0 \\ r_d \end{bmatrix} - \begin{bmatrix} -e_k^m \\ y_k^z \end{bmatrix};$$

wherein, $$\begin{bmatrix} -e_k^m \\ y_k^Z \end{bmatrix} = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix} \begin{bmatrix} u_k \\ r_k \end{bmatrix};$$

letting $$G = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix},$$

wherein an inversion form of G is expressed as follows:

$$G^{-1} = \frac{1}{G_{11}G_{22} - G_{21}G'_{12}} \begin{bmatrix} G_{22} & -G_{12} \\ -G_{21} & G_{11} \end{bmatrix};$$

and substituting $$G = \begin{bmatrix} \dfrac{P_m(z)}{1+C(z)P_m(z)} & \dfrac{-1}{1+C(z)P_m(z)} \\ \dfrac{P_m(z)P_z(z)}{1+C(z)P_m(z)} & \dfrac{C(z)P_m(z)P_z(z)}{1+C(z)P_m(z)} \end{bmatrix}$$

into the inversion form of G to obtain the inversion model:

$$G^{-1} = \begin{bmatrix} C(z) & \dfrac{1}{P_m(z)P_z(z)} \\ -1 & \dfrac{1}{P_z(z)} \end{bmatrix};$$

in step (S8), the model inversion-based iterative learning control model of the printer based on the inversion model is expressed as follows:

$$\begin{bmatrix} u_{k+1} \\ r_{k+1} \end{bmatrix} = \begin{bmatrix} u_k \\ r_k \end{bmatrix} + G^{-1} \begin{bmatrix} e_k^m \\ e_k^z \end{bmatrix}$$

and $u_{k+1}$ and $r_{k+1}$ are respectively expressed as follows:

$$u_{k+1} = u_k + C(z)e_k^m + \frac{1}{P_m(z)P_z(z)} e_k^z; \text{ and}$$

$$r_{k+1} = r_k - e_k^m + \frac{1}{P_z(z)} e_k^z;$$

wherein $e_k^z$ represents the error sequence of the desired trajectory $r_d$ and the actual displacement $y_k^z$ of the printing paper; $e_k^m$ represents the error sequence of the reference input and the actual displacement $y_k^m$ of the motor; $u_{k+1}$ represents the (k+1)-th control compensation obtained through updating the modified control compensation $u_k$ in the k-th trial using the model inversion-based iterative learning control model; and $r_{k+1}$ represents the (k+1)-th modified reference input obtained through updating the modified reference input $r_k$ in the k-th trial using the model inversion-based iterative learning control model.

In a second aspect, the present disclosure provides a printer system, comprising: an initialization module;
an identification module;
a printer;
a feedback control module; and
a judgment module;
wherein the initialization module is configured to set a desired trajectory $r_d$ of the printer and initialize a reference input $r_0$ and a control compensation $u_0$ of the printer;
the identification module is configured to obtain a transfer function $P_m(z)$ between a driving torque of the printer and a displacement of a motor and a transfer function $P_z(z)$ between the displacement of the motor and a displacement of a printing paper;
the printer comprises a carriage, a print surface, a roller mechanism, the motor, an image processing scanner and an encoder; wherein the encoder, the motor, the roller mechanism are connected in sequence; the motor is configured to drive the roller mechanism to rotate; the encoder is provided with a scanning module configured for scanning and recording an actual displacement $y_k^m$ of the motor; the image processing scanner is fixedly provided on a bottom surface of the carriage; a gap is provided between the bottom surface of the carriage and a top surface of the print surface; the roller mechanism is configured to drive a printing paper to pass through an end of the gap; and the image processing scanner is configured to scan and record an actual displacement $y_k^z$ of the printing paper;
the feedback control module is configured to receive the actual displacement $y_k^m$ of the motor transmitted by the scanning module and the actual displacement $y_k^z$ of the printing paper transmitted by the image processing scanner, and construct a model inversion-based iterative learning control model to modify the actual displacement $y_k^m$ of the motor transmitted by the scanning module and the actual displacement $y_k^z$ of the printing paper transmitted by the image processing scanner; and
the judgment module is configured to determine whether an error sequence $e_k^z$ between the desired trajectory $r_d$ and the actual displacement $y_k^z$ of the printing paper and an error sequence between the reference input $r_k$ and the actual displacement $y_k^m$ of the motor are both less than e and transmit a determination result to the feedback control module.

In some embodiments, the identification module is a matrix laboratory (MATLAB) system identification toolbox to obtain the transfer function $P_m(z)$ between the driving torque of the printer and the displacement of the motor and the transfer function $P_z(z)$ between the displacement of the motor and the displacement of the printing paper.

Compared with the prior art, the present disclosure has the following beneficial effects.

In the present disclosure, the error between the desired trajectory and the actual displacement of the printing paper and the error between the reference input and the actual displacement of the motor are simultaneously taken into consideration, and then a model inversion-based iterative learning control model for a printer is constructed. In this way, the error results are iteratively modified, and the unsatisfactory reference input and the control compensation are iteratively updated, so as to avoid the problem that the existing printing accuracy control methods merely perform error control on a single target, which may lead to the jitter or vibration of the system and cause insufficient robustness. The method provided herein does not rely on an accurate system model, and can balance the goal of the error suppression for motor and printing paper, improving the printing accuracy and quality.

DETAILED DESCRIPTION OF EMBODIMENTS

The accompany drawings are illustrative, and not intended to limit the present disclosure. Parts of the embodiment in accompany drawings may be omitted, enlarged or downsized to better illustrate the embodiment, and do not represent the actual size.

For those skilled in the art, it should be understood that some descriptions of the existing technical solutions in the accompany drawings may be omitted.

Technical solutions of this disclosure are further described below with reference to the accompany drawings and the embodiments.

Embodiment 1

Figure 1:
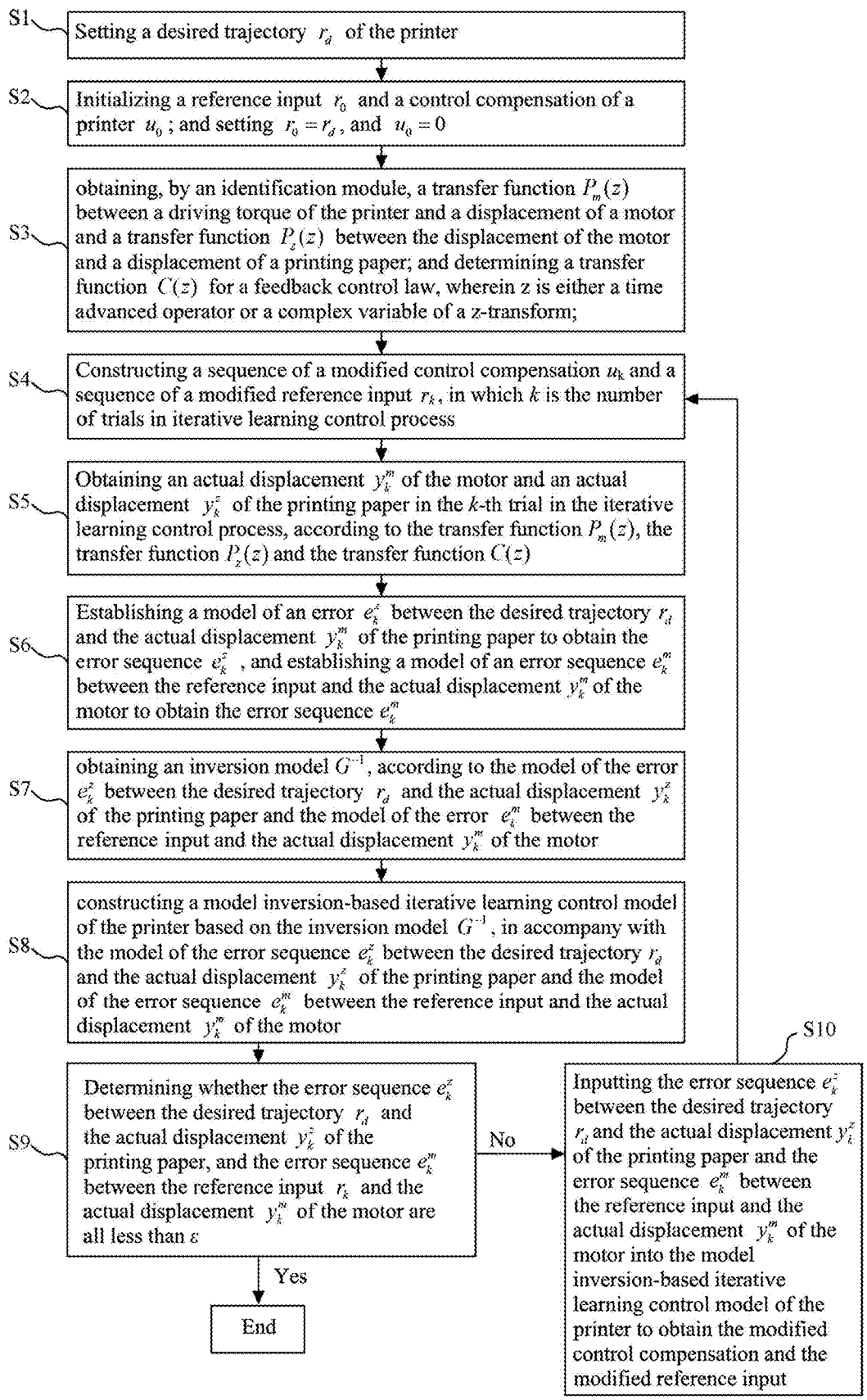
FIG. 1 is a flow chart of a model inversion-based iterative learning control method for a printer according to an embodiment of the present disclosure.

As shown in FIG. 1, a model inversion-based iterative learning control method for a printer is provided, which includes the following steps.

(S1) A desired trajectory $r_d$ of the printer is set. In this embodiment, $r_d = 0.05t^2(20-t)\sin(0.61\pi t)$.

(S2) A reference input $r_0$ of the printer and a control compensation $u_0$ of the printer are initialized, and $r_0 = r_d$, $u_0 = 0$ are set.

(S3) A transfer function $P_m(z)$ between a driving torque of the printer and a displacement of a motor and a transfer function $P_z(z)$ of the displacement of the motor and a displacement of a printing paper are determined through an identification module. A feedback control law transfer function $C(z)$ is determined, in which z is either the time advanced operator or the complex variable of the z-transform. In the embodiment, the identification module adopts the commercial matrix laboratory (MATLAB) system identification toolbox, and the identified displacement transfer function $P_m(z)$ between the driving torque of the printer and the displacement of the motor is expressed as follows:

$$P_m(z) = \frac{0.1282z^{-1} - 0.2387z^{-2} + 0.1192z^{-3}}{1 - 3.711z^{-1} + 5222z^{-2} - 3.298z^{-3} + 0.7873z^{-4}}.$$

Similarly, the transfer function P (z) as follows:

$$P_z(z) = \frac{0.06837z^{-1} - 0.01256z^{-2}}{1 - 1.917z^{-1} + 0.9731z^{-2}};$$

the feedback control law (proportional-integral) transfer function C(z) is designed as:

$$C(z) = \frac{0.56247z - 0.54025}{z - 1}.$$

(S4) A sequence of a modified control compensation $u_k$ and a sequence of a modified reference input $r_k$ are constructed, and k is the number of trials in an iterative learning process. The sequence expression of the modified control compensation $u_k$ is expressed as follows:

$$u_k = [u_k(1), u_k(2), \ldots u_k(N)];$$

the sequence expression of the modified reference input $r_k$ is expressed as follows:

$$r_k = [r_k(1), r_k(2), \ldots r_k(N)];$$

in which, N represents the maximum number of samples within sampling time T; when k is 0, the sequence of the modified control compensation $u_k$ is the initialized control compensation $u_0$, and the sequence of the modified reference input $r_k$ is the initialized reference input $r_0$.

(S5) An actual displacement $y_k^m$ of the motor and an actual displacement $y_k^z$ of the printing paper in the k-th trial in the model inversion-based iterative learning control process are obtained according to the transfer function $P_m(z)$, the transfer function $P_z(z)$ and the transfer function $C(z)$.

The actual displacement $y_k^m$ of the motor in the k-th trial in the model inversion-based iterative learning control process is expressed as follows:

$$y_k^m = \frac{P_m(z)}{1 + C(z)P_m(z)} u_k + \frac{C(z)P_m(z)}{1 + C(z)P_m(z)} r_k;$$

the actual displacement $y_k^z$ of the printing paper is expressed as follows:

$$y_k^m = \frac{P_m(z)P_Z(z)}{1 + C(z)P_m(z)} u_k + \frac{C(z)P_m(z)P_z(z)}{1 + C(z)P_m(z)} r_k;$$

in which $P_m(z)$ represents the transfer function between the driving torque of the printer and the displacement of the motor; $P_z(z)$ represents the transfer function between the displacement of the motor and the displacement of the printing paper; and C(z) represents the transfer function for the feedback control law.

(S6) A model of an error sequence $e_k^z$ between the desired trajectory $r_d$ and the actual displacement $y_k^z$ of the printing paper is established to obtain the error sequence $e_k^z$, and a model of an error sequence $e_k^m$ between the reference input and the actual displacement $y_k^m$ of the motor is established to obtain the error sequence.

The model of the error $e_k^z$ between the desired trajectory $r_d$ and the actual displacement $y_k^z$ of the printing paper is expressed as:

$$e_k^z = r_d - y_k^z;$$

in which, $e_k^z$ represents an error sequence of the desired trajectory $r_d$ and the actual displacement $y_k^z$ of the printing paper.

The model of the error $e_k^m$ between the reference input and the actual displacement $y_k^m$ of the motor is expressed as:

$$e_k^m = r_k - y_k^m;$$

in which, $e_k^m$ represents an error sequence of the reference input and the actual displacement $y_k^m$ of motor; and $r_k$ represents the modified reference input.

(S7) An inversion model $G^{-1}$ is obtained according to the model of the error $e_k^z$ between the desired trajectory $r_d$ and the actual displacement $y_k^z$ of the printing paper and the model of the error $e_k^m$ between the reference input and the actual displacement $y_k^m$ of the motor;

in which the inversion model $G^{-1}$ is obtained through steps of:

combining the model of the error $e_k^z$ between the desired trajectory $r_d$ and the actual displacement $y_k^z$ of the printing paper and the model of the error $e_k^m$ between the reference input and the actual displacement $y_k^m$ of the motor to obtain an error matrix expressed as follows:

$$\begin{bmatrix} e_k^m \\ e_k^z \end{bmatrix} = \begin{bmatrix} 0 \\ r_d \end{bmatrix} - \begin{bmatrix} -e_k^m \\ y_k^z \end{bmatrix};$$

in which, $$\begin{bmatrix} -e_k^m \\ y_k^z \end{bmatrix} = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix} \begin{bmatrix} u_k \\ r_k \end{bmatrix};$$

letting $$G = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix},$$

in which an inversion form of G is expressed as follows:

$$G^{-1} = \frac{1}{G_{11}G_{22} - G_{21}G_{12}} \begin{bmatrix} G_{22} & -G_{12} \\ -G_{21} & G_{11} \end{bmatrix};$$

and substituting $$G = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix},$$

the inversion form of G to obtain the inversion model:

$$G^{-1} = \begin{bmatrix} C(z) & \frac{1}{P_m(z)P_z(z)} \\ -1 & \frac{1}{P_m(z)} \end{bmatrix}.$$

(S8) A model inversion-based iterative learning control model is constructed based on inversion model of $G^{-1}$, in accompany with the model of the error sequence $e_k^z$ between the desired trajectory $r_d$ and the actual displacement $y_k^z$ of the printing paper and the model of the error sequence $e_k^m$ between the reference input and the actual displacement $y_k^m$ of the motor;

the model inversion-based iterative learning control model of the printer based on the inversion model is expressed as follows:

$$\begin{bmatrix} u_{k+1} \\ r_{k+1} \end{bmatrix} = \begin{bmatrix} u_k \\ r_k \end{bmatrix} + G^{-1} \begin{bmatrix} e_k^m \\ e_k^z \end{bmatrix};$$

and $u_k+1$ and $r_k+1$ are respectively expressed as follows:

$$u_{k+1} = u_k + C(z)e_k^m + \frac{1}{P_m(z)P_z(z)} e_k^z; \text{ and}$$

$$r_{k+1} = r_k - e_k^m + \frac{1}{P_z(z)} e_k^z;$$

in which $e_k^z$ represents the error sequence between the desired trajectory $r_d$ and the actual displacement $y_k^z$ of the printing paper; $e_k^m$ represents the error sequence between the reference input and the actual displacement $y_k^m$ of the motor; $u_{k+1}$ represents the (k+1)-th control compensation obtained through updating the modified control compensation $u_k$ in the k-th trial using the model inversion-based iterative learning control model; and $r_{k+1}$ represents the (k+1)-th modified reference input obtained through updating the modified reference input $r_k$ in the k-th trial using the model inversion-based iterative learning control model.

(S9) Whether the error sequence $e_k^z$ between the desired trajectory $r_d$ and the actual displacement $y_k^m$ of the printing paper, and the error sequence $e_k^m$ between the reference input and the actual displacement $y_k^m$ of the motor are all less than e are determined; if yes, the model inversion-based iterative learning control process is ended; otherwise, step (S10) is performed. In this embodiment, ε is set to 0.01 mm to render the error standard low enough, ensuring the printing quality.

(S10) The error sequence $e_k^z$ between the desired trajectory $r_d$ and the actual displacement $y_k^z$ of the printing paper and the error sequence $e_k^m$ between the reference input and the actual displacement $y_k^m$ of the motor are input into the model inversion-based iterative learning control model of the printer to obtain the modified control compensation and the modified reference input for trial; and proceeding to step (S4).

Figure 2:
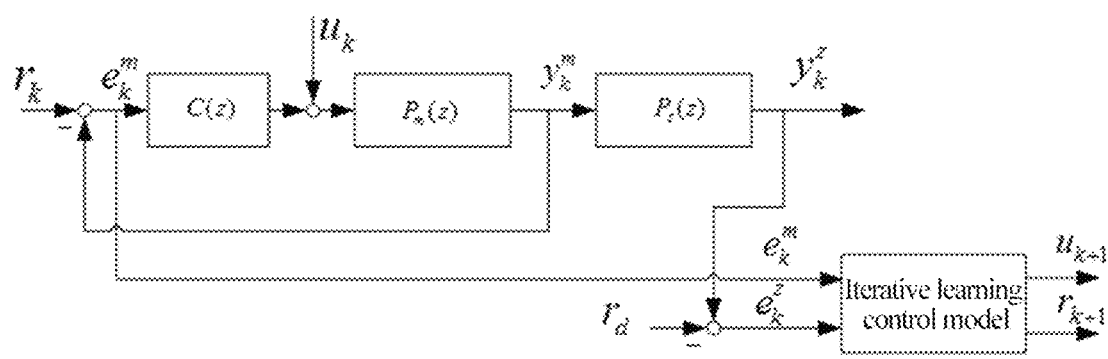
FIG. 2 schematically depicts a model inversion-based iterative learning control method for the printer.

FIG. 2 schematically depicts a model inversion-based iterative learning control method for the printer. The transfer function $P_m(z)$ between the driving torque of the printer and the displacement of the motor, the transfer function $P_z(z)$ between the displacement of the motor and the displacement of the printing paper are obtained by the identification module, and the transfer function C(z) for the feedback control law is designed. The error sequence $e_k^z$ and the error sequence $e_k^m$ are considered at the same time. The error sequence $e_k^z$ and the error sequence $e_k^m$ would be put into the model inversion-based iterative learning control if they fail to meet requirements, so as to avoid the problem that the existing methods merely perform error control on a single target. If the error control is only performed on the motor or the printing paper, it is easy to cause the jitter or vibration of the system and insufficient robustness.

Figure 3:
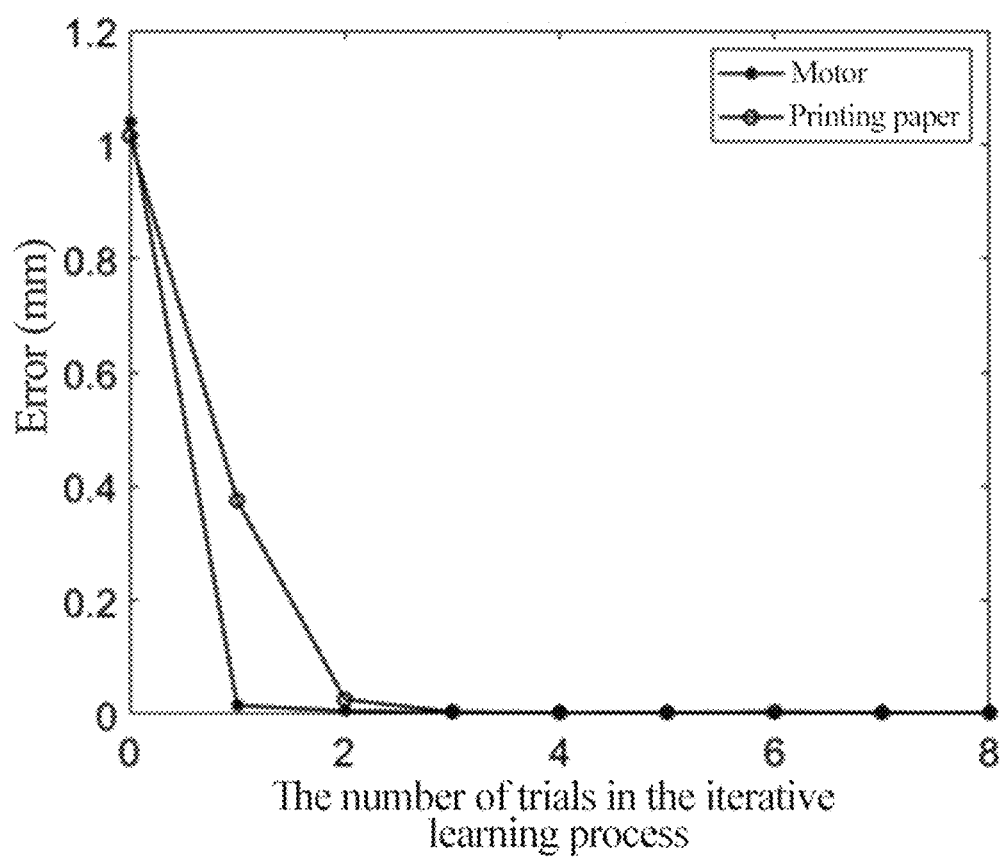
FIG. 3 depicts an error convergence of a motor and an error convergence of a printing paper with the number of trails in an iterative learning process.

FIG. 3 depicts an error convergence of a motor and an error convergence of a printing paper with the number of trails in an iterative learning process. The horizontal axis represents the numbers of trials in iterative learning process, and the vertical axis represents the error value (root mean square of a sequence) of the motor and the printing paper. It can be seen from FIG. 3 that at the initial trial (k=0), both the motor and the printing paper reach to 1 mm, which does not meet the requirement on large-format printers. However, being modified by the model inversion-based iterative learning control method provided herein, the error gradually decreases, which means that the corresponding printing quality is improved. When the root mean square of the error sequence is reduced to less than 0.01 mm, the model inversion-based iterative learning control process is stopped.

Figure 4:
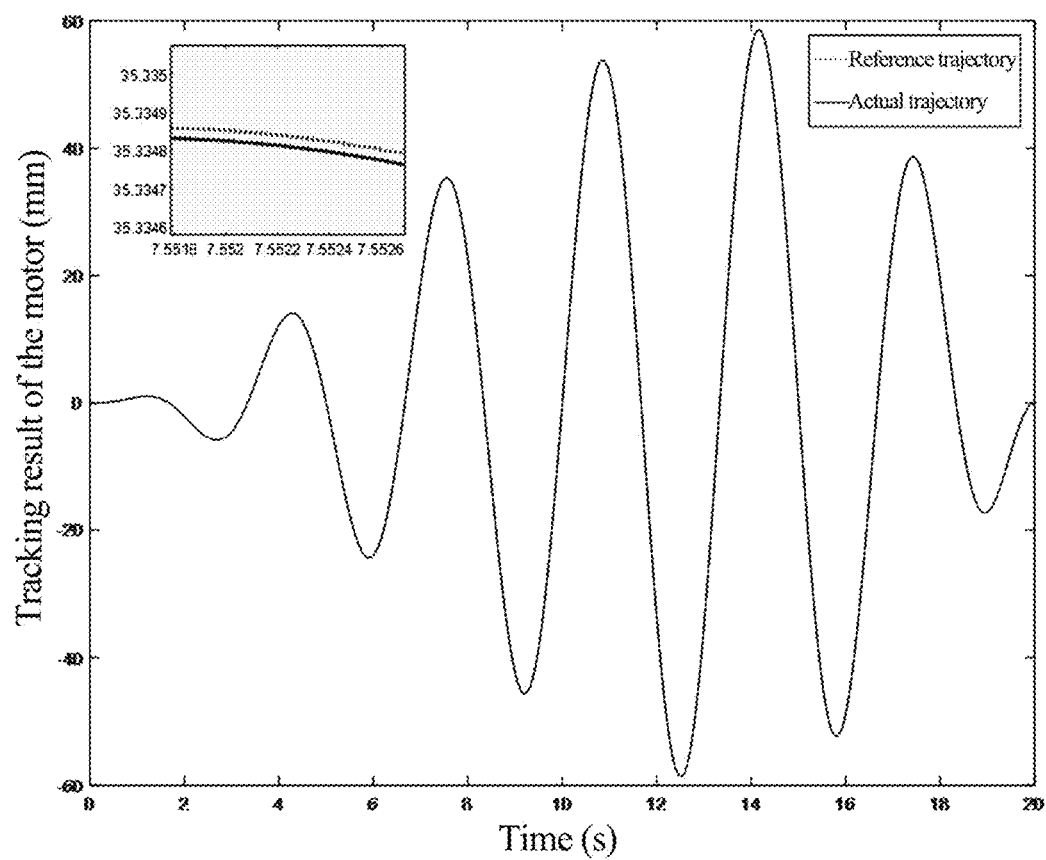
FIG. 4 illustrates tracking comparison between a reference input and an actual trajectory of the motor after four iterative learning.
Figure 5:
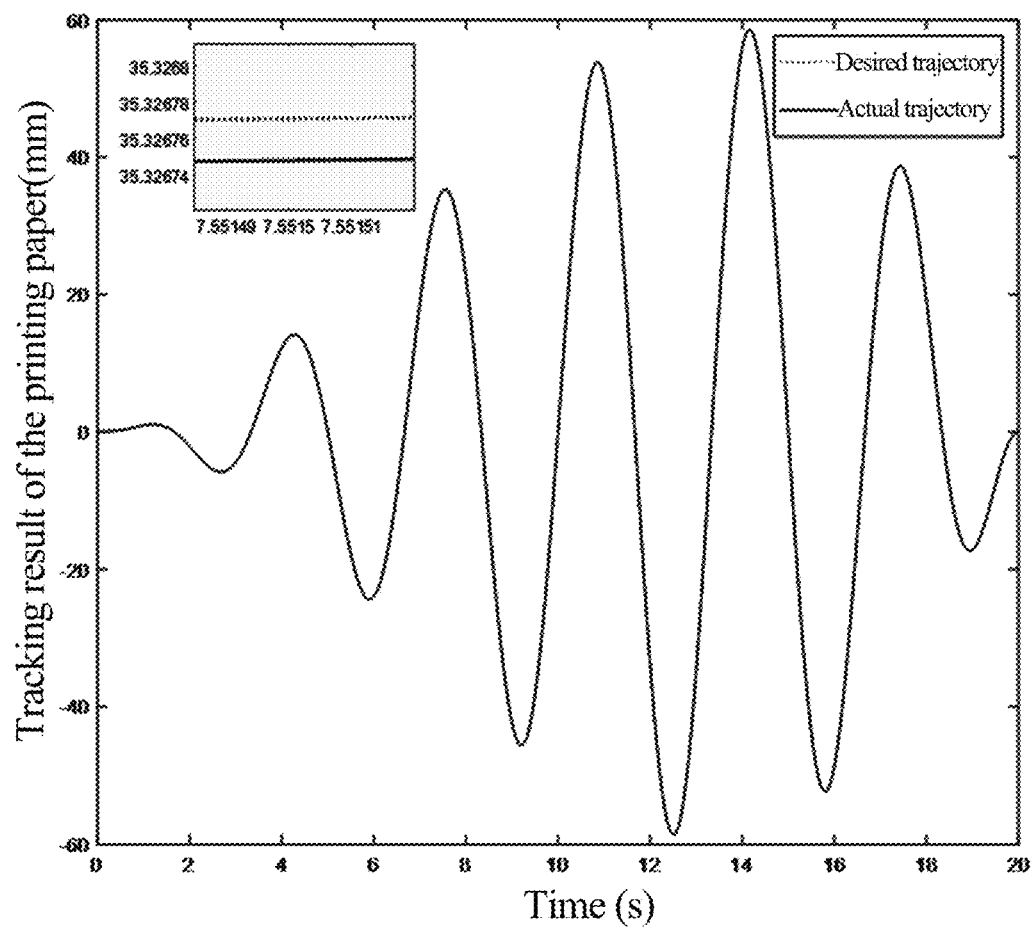
FIG. 5 illustrates tracking comparison between a desired trajectory and an actual trajectory of the printing paper after four iterative learning.

FIG. 4 shows a tracking comparison between a reference input and an actual trajectory of the motor. FIG. 5 shows a tracking comparison between a desired trajectory and an actual trajectory of the printing paper. The horizontal axis represents the trajectory result, and the vertical axis represents sampling time. FIG. 3 shows that when after 4 trials or more, the error value is reduced to less than 0.01 mm and the model inversion-based iterative learning control process stops. The comparison results in FIG. 4 and FIG. 5 directly show the effectiveness of proposed method herein. In FIG. 4, the dashed line represents the reference input, and the solid line represents the actual trajectory of the motor. In FIG. 5, the dashed line represents the desired trajectory of the printing paper, and the solid line represents the actual trajectory of the printing paper. In FIG. 4, the actual trajectory of the motor end is very close to, almost coincident with, the reference input for the motor. And the comparison result with a finer scale enlargement can be seen in FIG. 4. The comparison in FIG. 5 is almost the same, indicating that the model inversion-based iterative learning control method provided herein has a better printing quality.

Figure 6:
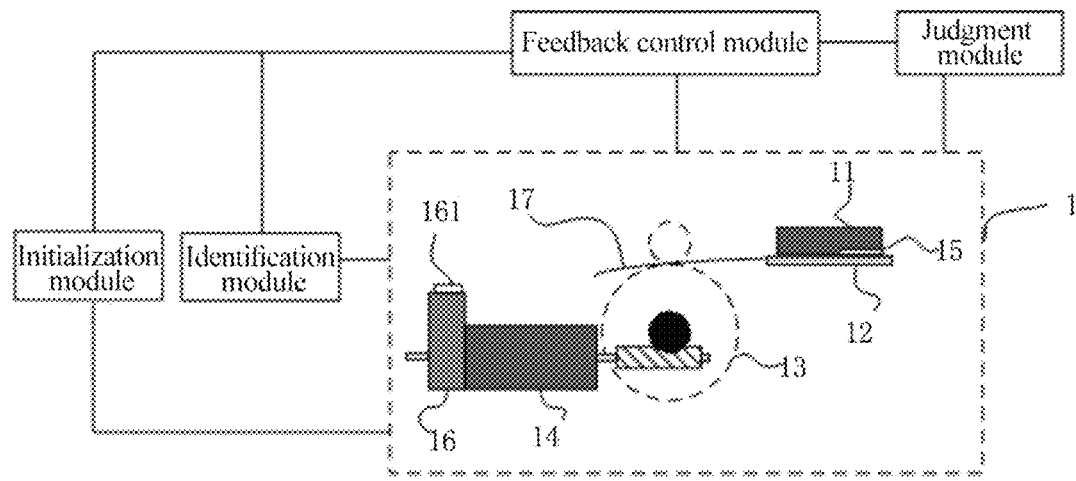
FIG. 6 schematically depicts a structural connection of a printer system according to an embodiment of the present disclosure.

As shown in FIG. 6, the printer system is provided, which includes an initialization module, an identification module, a printer 1, a feedback control module, and a judgment module. The initialization module is configured to set a desired trajectory $r_d$ of the printer and initialize a reference input $r_0$ and a control compensation $u_0$ of the printer. The identification module is configured to obtain a transfer function $P_m(z)$ between a driving torque of the printer and a displacement of a motor and a transfer function $P_z(z)$ between the displacement of the motor and a displacement of a printing paper. The printer 1 includes a carriage 11, a print surface 12, a roller mechanism 13, the motor 14, an image processing scanner 15 and an encoder 16, in which the encoder 16 the motor 14, the roller mechanism 13 are connected in sequence. The motor 14 is configured to drive the roller mechanism 13 to rotate. The encoder 16 is provided with a scanning module 161 configured for scanning and recording an actual displacement $y_k^m$ of the motor. The image processing scanner 15 is fixedly provided on a bottom surface of the carriage 11. A gap is provided between the bottom surface of the carriage 11 and a top surface of the print surface 12. The roller mechanism 13 is configured to drive the printing paper 17 to pass through an end of the gap and the image processing scanner 15 is configured to scan and record an actual displacement $y_k^z$ of the printing paper 17.

The feedback control module is configured to receive the actual displacement $y_k^m$ of the motor transmitted by the scanning module 161 and the actual displacement $y_k^z$ of the printing paper transmitted by the image processing scanner 15, and construct a model inversion-based iterative learning control model to modify the actual displacement $y_k^m$ of the motor transmitted by the scanning module 161 and the actual displacement $y_k^z$ of the printing paper transmitted by the image processing scanner 15.

The judgment module is configured to determine whether an error sequence $e_k^z$ between the desired trajectory $r_d$ and the actual displacement $y_k^z$ of the printing paper and an error sequence between the reference input $r_k$ and the actual displacement $y_k^m$ of the motor are both less than e and transmit a determination result to the feedback control module.

The positional relationships in the accompany drawings are merely illustrative, and not intended to limit the present disclosure.

Obviously, the above-mentioned embodiments are merely illustrative, and are not intended to limit the disclosure. It should be understood that modifications and variations made by those skilled in the art without departing from the spirit of the present disclosure should fall within the scope of the present disclosure defined by the appended claims.

What is claimed is:

1. A model inversion-based iterative learning control method for a printer, comprising:
   (S1) setting a desired trajectory $r_d$ of the printer;
   (S2) initializing a reference input $r_0$ and a control compensation $u_0$ of the printer: $r_0=r_d$, and $u_0=0$;
   (S3) obtaining, by an identification module, a transfer function $p_m(z)$ between a driving torque of the printer and a displacement of a motor and a transfer function $P_z(z)$ between the displacement of the motor and a displacement of a printing paper; and determining a transfer function $C(z)$ for a feedback control law, wherein z is either a time advanced operator or a complex variable of a z-transform;
   (S4) constructing a sequence of a modified control compensation $u_k$ and a sequence of a modified reference input $r_k$, wherein k is the number of trials in an iterative learning process; the sequence of the modified control compensation $u_k$ is expressed as follows:

$$u_k = [u_k(1), u_k(2), \ldots u_k(N)];$$

the sequence of the modified reference input $r_k$, is expressed as follows;

$$r_k = [r_k(1), r_k(2), \ldots r_k(N)];$$

wherein, N represents the maximum number of samples within discrete sampling time T; when k is 0, the sequence of the modified control compensation $u_k$ is the initialized control compensation $u_0$, and the sequence of the modified reference input $r_k$ is the initialized reference input $r_0$;
   (S5) obtaining an actual displacement $y_k^m$ of the motor and an actual displacement $y_k^z$, of the printing paper in the k-th trial in the iterative learning control process according to the transfer function $P_m(z)$, the transfer function $P_z(z)$ and the transfer function $C(z)$;
the actual displacement $y_k^m$ of the motor in the k-th trial in the iterative learning control process is expressed as follows:

$$y_k^m = \frac{P_m(z)}{1+C(z)P_m(z)}u_k + \frac{C(z)P_m(z)}{1+C(z)P_m(z)}r_k;$$

the actual displacement $y_k^z$ of the printing paper is expressed as follows:

$$y_k^m = \frac{P_m(z)P_z(z)}{1+C(z)P_m(z)}u_k + \frac{C(z)P_m(z)P_z(z)}{1+C(z)P_m(z)}r_k;$$

wherein $P_m(z)$ represents the transfer function between the driving torque of the printer and the displacement of the motor; $P_z(z)$ represents the transfer function between the displacement of the motor and the displacement of the printing paper; and $C(z)$ represents the transfer function for the feedback control law;

(S6) establishing a model of an error sequence $e_k^z$ between the desired trajectory $r_d$ and the actual displacement $y_k^z$ of the printing paper to obtain the error sequence $e_k^z$; and establishing a model of an error sequence $e_k^m$ between the reference input and the actual displacement $y_k^m$ of the motor to obtain the error sequence $e_k^m$;

the model of the error $e_k^z$, between the desired trajectory $r_d$ and the actual displacement $y_k^z$ of the printing paper is expressed as:

$$e_k^z = r_d - y_k^z;$$

wherein $e_k^z$ represents an error sequence of the desired trajectory $r_d$ and the actual displacement $y_k^z$ of the printing paper;

the model of the error $e_k^m$ between the reference input $r_k$ and the actual displacement $y_k^m$ of the motor is expressed as:

$$e_k^m = r_k - y_k^m;$$

wherein $e_k^m$ represents an error sequence of the reference input and the actual displacement $y_k^m$ of motor; and $r_k$ represents the modified reference input;

(S7) obtaining an inversion model $G^{-1}$ according to the model of the error $e_k^z$ between the desired trajectory $r_d$ and the actual displacement $y_k^z$ of the printing paper and the model of the error $e_k^m$ between the reference input and the actual displacement $y_k^m$ of the motor;

wherein the inversion model $G^{-1}$ is obtained through steps of:

combining the model of the error sequence $e_k^z$ between the desired trajectory $r_d$ and the actual displacement $y_k^z$ of the printing paper and the model of the error sequence $e_k^m$ between the reference input and the actual displacement $y_k^m$ of the motor as follows:

$$\begin{bmatrix} e_k^m \\ e_k^z \end{bmatrix} = \begin{bmatrix} 0 \\ r_d \end{bmatrix} - \begin{bmatrix} -e_k^m \\ y_k^z \end{bmatrix};$$

wherein, $$\begin{bmatrix} -e_k^m \\ y_k^z \end{bmatrix} = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix} \begin{bmatrix} u_k \\ r_k \end{bmatrix};$$

letting $$G = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix},$$

wherein an inversion form of G is expressed as follows:

$$G^1 = \frac{1}{G_{11}G_{22}-G_{21}G'_{12}}\begin{bmatrix} G_{22} & -G_{12} \\ -G_{21} & G_{11} \end{bmatrix}; \text{ and}$$

substituting $$G = \begin{bmatrix} \frac{P_m(z)}{1+C(z)P_m(z)} & \frac{-1}{1+C(z)P_m(z)} \\ \frac{P_m(z)P_z(z)}{1+C(z)P_m(z)} & \frac{C(z)P_m(z)P_z(z)}{1+C(z)P_m(z)} \end{bmatrix}$$

into the inversion form of G to obtain the inversion model:

$$G^1 = \begin{bmatrix} C(z) & \frac{1}{P_m(z)P_z(z)} \\ -1 & \frac{1}{P_z(z)} \end{bmatrix};$$

and (S8) constructing a model inversion-based iterative learning control model of the printer based on the inversion model $G^{-1}$, in accompany with the model of the error sequence $e_k^z$, between the desired trajectory $r_d$ and the actual displacement $y_k^z$ of the printing paper and the model of the error sequence $e_k^m$ between the reference input and the actual displacement $y_k^m$ of the motor;

in step (S8), the model inversion-based iterative learning control model of the printer based on the inversion model is expressed as follows:

$$\begin{bmatrix} u_{k+1} \\ r_{k+1} \end{bmatrix} = \begin{bmatrix} u_k \\ r_k \end{bmatrix} + G^{-1}\begin{bmatrix} e_k^m \\ e_k^z \end{bmatrix};$$

$u_{k+1}$ and $r_{k+1}$ are respectively expressed as follows:

$$u_{k+1} = u_k + C(z)e_k^m + \frac{1}{P_m(z)P_z(z)}e_k^z; \text{ and}$$

$$r_{k+1} = r_k - e_k^m + \frac{1}{P_z(z)}e_k^z;$$

wherein $e_k^z$ represents the error sequence of the desired trajectory $r_d$ and the actual displacement $y_k^z$ of the printing paper; $e_k^m$ represents the error sequence of the reference input and the actual displacement $y_k^m$ of the motor; $u_{k+1}$ represents the (k+1)-th control compensation obtained through updating the modified control compensation $u_k$ in the k-th trial using the model inversion-based iterative learning control model; and $r_{k+1}$ represents the (k+1)-th modified reference input obtained through updating the modified reference input $r_k$ in the k-th trial using the model inversion-based iterative learning control model;

(S9) determining whether the error sequence $e_k^z$ between the desired trajectory $r_d$ and the actual displacement $y_k^z$ of the printing paper, and the error sequence $e_k^m$ between the reference input $r_k$ and the actual displacement $y_k^m$ of the motor are all less than ε; if yes, ending the iterative learning control process; otherwise, proceeding to step (S10); and (S10) inputting the error sequence $e_k^z$ between the desired trajectory $r_d$ and the actual displacement $y_k^z$ of the printing paper and the error sequence $e_k^m$ between the reference input and the actual displacement $y_k^m$ of the motor into the model inversion-based iterative learning control model of the printer to obtain the modified control compensation and the modified reference input; and proceeding to step (S4).

\* \* \* \* \*